Jan. 16, 1934.  K. W. WARREN  1,943,851

SAFETY FILLER PLUG

Filed March 18, 1932

INVENTOR.
KENNETH W. WARREN
BY
ATTORNEY

Patented Jan. 16, 1934

1,943,851

UNITED STATES PATENT OFFICE 1,943,851

SAFETY FILLER PLUG

Kenneth W. Warren, South Bend, Ind., assignor to Bendix Aviation Corporation, South Bend, Ind., a corporation of Delaware Application March 18, 1932. Serial No. 599,803

1 Claim. (Cl. 267—64)

This invention relates to shock absorbers and more particularly to shock absorber struts for airplanes.

Heretofore shock struts for airplanes have been provided with a valve for admitting air to the strut. Generally these valves are threaded into the wall of the strut adjacent the upper end thereof. In both pneumatic and hydraulic pneumatic shock struts, the pressure in the strut is maintained at a relatively high degree in order to attain the desired performance of the strut.

This has necessitated the use of a valve of relatively rigid structure having means for discharging the air from the strut preparatory to removing the valve for purposes of replacement and repairs. In removing the valve it has been found that due to the exceedingly high pressure carried in the strut, the valve upon being backed out is blown with great force from the strut causing injury to mechanics and often stripping the last few threads in the orifice in which the valve is secured. It is an object of the present invention to overcome these objections.

Broadly, the invention comprehends a shock strut of the hydraulic pneumatic type including telescopic cylinders or casings one of which is provided with a feed valve for the admission of air under pressure. The valve is threaded into an orifice in the strut and it may be readily removed, and the valve is provided with means to avoid any possibility of an operator removing the valve while there is still air pressure in the cylinders.

As shown, the valve is provided with one or more diametral bores serving as vents for the escape of air prior to the removal of the valve. The diametral bores or vents are so arranged that the air escapes in a stream in a plane parallel to the wall of the strut, thereby preventing a blast or current of air in the face of the operator, and thus avoid any liability of injury to the operator by the removal of the valve while there is still a high pressure in the strut.

An object of the invention is to provide a shock strut of the hydraulic pneumatic type having means providing for the escape of the air in the strut prior to the removal of the valve.

Another object of the invention is to provide a shock strut of the hydraulic pneumatic type having a feed valve which may be easily and quickly removed without liability of ejecting the valve with great force due to the pressure of air in the strut.

A further object of the invention is to provide a shock strut of the hydraulic pneumatic type having a feed valve provided with means for directing a current of air from the strut outwardly and in a plane parallel to the strut, so that air will not be ejected in the face of an operator when removing the valve.

Yet a further object of the invention is to provide a shock strut of the hydraulic pneumatic type having a feed valve provided with means for permitting the escape of air from the strut after the initial movement of the valve tending to remove it from the strut for purposes of replacement and repairs.

A feature of the invention is a shock strut having a feed valve provided with a diametral bore for the escape of air from the strut.

Other objects and features of the invention will appear from the following description taken in connection with the drawing, which form a part of this specification, and in which.

Figures 1, 2, 3:
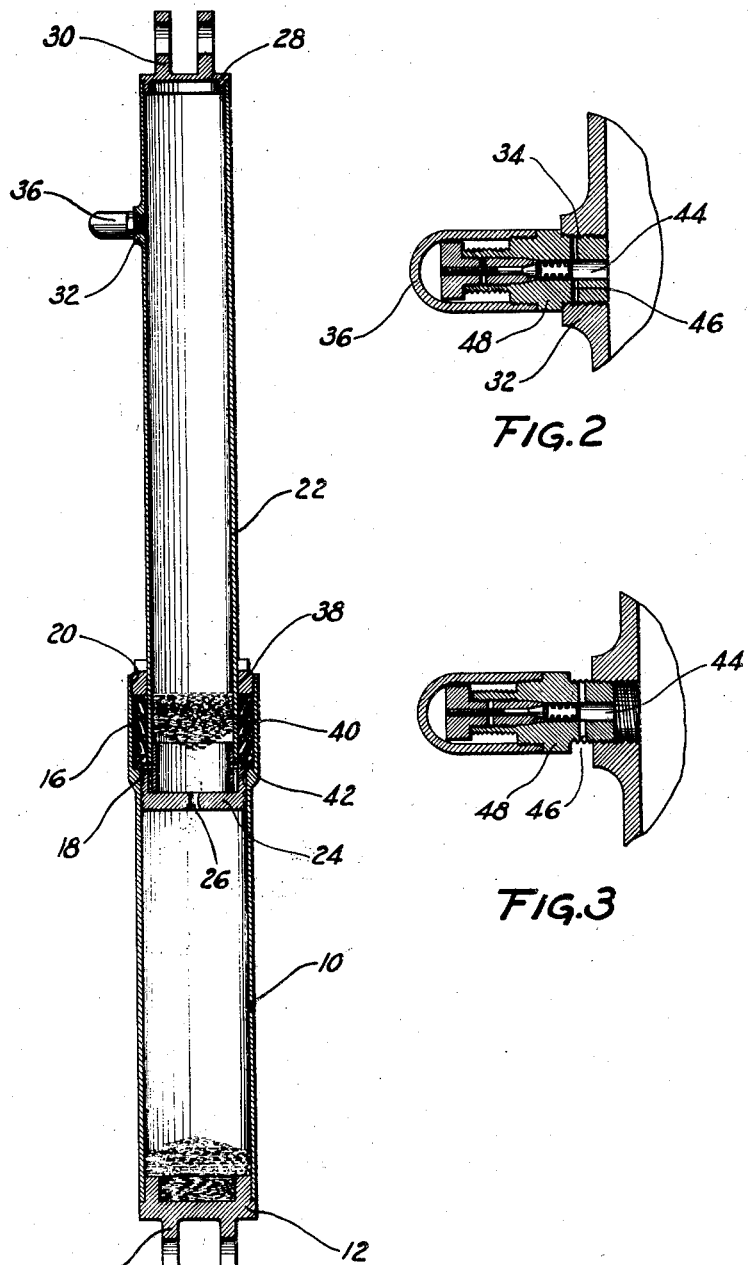
Figure 1 is a vertical sectional view of the strut illustrating the invention as applied.
Figure 2 is an enlarged sectional view of the feed valve threaded into the wall of the strut.
Figure 3 is an enlarged sectional view of the valve partially removed.

Referring to the drawing for more specific details of the invention, 10 represents a cylindrical casing having threaded or otherwise secured in one end a cap 12 provided with a clevis 14 for the attachment of a landing gear, not shown. The other end of the casing is slightly enlarged as at 16 to provide a shoulder 18. The enlarged portion being internally threaded as at 20.

The cylindrical casing 22 having suitably secured in one end a piston 24 provided with an orifice 26 and the other end of this casing is closed by a cap 28 provided with a clevis 30 for attachment to the fuselage of an airplane, not shown.

The casing 22 has formed in the wall thereof a boss 32 provided with a bore 34 in which is threaded a feed valve 36 to be hereinafter described. The cylindrical casing 22 telescopes the cylindrical casing 10, with the piston 24 movable smoothly therein. The casings are secured together by a packing ring 38 threaded in the enlarged portion 16 on the casing 10 with suitable packing material 40 interposed between the packing ring 38 and a retaining ring 42 seated on the shoulder 18 and adapted to engage the skirt of the piston when the strut is in an extended position.

The cylindrical casing 10 is completely filled with oil to a level above the piston 24 and above the oil the cylindrical casing 22 is filled with air under relatively high pressure. When landing the cylindrical casings 10 and 22 telescope. This action forces the oil in the casing 10 through the orifice 26 in the piston into the casing 22 further compressing the air, as the velocity of the stroke decreases due to the absorption and dissipation of energy.

The pressure in the cylinder is extremely high and accordingly any attempt to remove the feed valve when pressure is still in the cylinders is very apt to cause bodily harm to the operator. To avoid this contingency the feed valve which may be of any preferred type having a central passage 44 for the admission of air under pressure is provided with one or more diametral bores 46 preferably arranged relatively near the shoulder 48 of the valve, so that upon backing the valve out of the orifice 34 the air in the strut will escape through the bore 44 and the diametral bores 46. Due to the particular arrangement of the bores 46 the air upon escaping will be discharged in a plane parallel with respect to the wall of the strut, so that it will not be discharged in the face of the operator. Because of the particular location of the diametral bores 46 the air will start to escape from the cylinder after the first few turns of the valve tending to remove it from the strut, and before the valve is entirely removed the pressure in the strut will be relieved to such an extent that no injury will be had to either the structure or to the operator.

Although this invention has been described in connection with certain specific embodiments, the principles involved are susceptible of numerous other applications that will readily occur to persons skilled in the art. The invention is, therefore, to be limited only as indicated by the scope of the appended claim.

Having thus described the various features of the invention what I claim as new and desire to secure by Letters Patent, is:

A pneumatic shock strut comprising a compressed gas chamber, a boss in the wall thereof having a threaded aperture, a feed valve plug threaded in said aperture, and comprising a threaded portion substantially the length of the chamber wall thickness, a shoulder terminating the threaded portion and adapted to coact with the exterior surface of the boss to form a seal when said plug is inserted in said aperture, an axial bore through said plug provided with a valve at the outer end, and a radial bore extending from said axial bore from a point inwardly of said valve to a point upon the threaded portion of said plug, a substantial distance from the inner end of the valve plug thereby leaving a sufficient threaded portion to retain the plug in the threaded boss against the high pressure of the gas chamber and permit escape of the air from the chamber upon partial unscrewing of the plug.

KENNETH W. WARREN.